United States Patent
Teragawa (10) Patent No.: US 10,107,953 B2
(45) Date of Patent: Oct. 23, 2018

(54) LIGHT GUIDE UNIT, LIGHT SOURCE DEVICE AND DISPLAY APPARATUS

(71) Applicant: SAKAI DISPLAY PRODUCTS CORPORATION, Sakai-shi, Osaka (JP)

(72) Inventor: Daisuke Teragawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 64 days.

(21) Appl. No.: 15/479,896

(22) Filed: Apr. 5, 2017

(65) Prior Publication Data

US 2017/0205563 A1  Jul. 20, 2017

Related U.S. Application Data

(63) Continuation of application No. PCT/JP2014/076705, filed on Oct. 6, 2014.

(51) Int. Cl.
  *F21V 8/00* (2006.01)

(52) U.S. Cl.
  CPC ........... *G02B 6/0055* (2013.01); *G02B 6/005* (2013.01); *G02B 6/009* (2013.01); *G02B 6/0043* (2013.01)

(58) Field of Classification Search
  CPC .... G02B 6/0055; G02B 6/0043; G02B 6/005; G02B 6/009; G02B 6/004; G02B 6/0035; G02B 6/0036; G02B 6/0033; G02B 6/0051; G02F 1/133504; G02F 1/133606; G02F 1/133615
  See application file for complete search history.

(56) References Cited

U.S. PATENT DOCUMENTS

| | | | | |
|---|---|---|---|---|
| 6,789,910 B2* | 9/2004 | Kimura | ............... | G02B 6/0028 362/600 |
| 8,740,438 B2* | 6/2014 | Hu | ....... | G02B 6/0023 362/231 |
| 2010/0067257 A1* | 3/2010 | Meis | ........... | G02B 5/0841 362/624 |
| 2016/0109643 A1* | 4/2016 | Teragawa | ............ | G02B 6/0055 362/624 |

FOREIGN PATENT DOCUMENTS

| | | |
|---|---|---|
| JP | 07-013503 | 1/1995 |
| JP | 2004-296345 A | 10/2004 |
| JP | 2013-093195 A | 5/2013 |
| WO | WO 2013/011813 A1 | 1/2013 |

OTHER PUBLICATIONS

Int'l. Search Report issued in Int'l. App. No. PCT/JP2014/076705, dated Nov. 11, 2014.

* cited by examiner

*Primary Examiner* — Bao Q Truong
(74) *Attorney, Agent, or Firm* — Greer Burns & Crain Ltd.

(57) ABSTRACT

A light guide unit according to an embodiment of the present invention includes: a light guide plate having a light outgoing surface and a light reflecting surface, the reflecting surface being opposite to the light outgoing surface; a reflection sheet disposed facing the reflecting surface of the light guide plate, and a plurality of light scattering units provided between the light guide plate and the reflection sheet, the plurality of light scattering units being apart for one another along the light reflecting surface, wherein each of the plurality of light scattering units includes a scattering layer and a reflection layer formed on the scattering layer, the scattering layer being fixed on the light reflecting surface.

7 Claims, 12 Drawing Sheets

LIGHT GUIDE UNIT, LIGHT SOURCE DEVICE AND DISPLAY APPARATUS

This is a continuation of International Application No. PCT/JP2014/076705, with an international filing date of Oct. 6, 2014, the contents of which are hereby incorporated by reference.

BACKGROUND

1. Technical Field

The present invention relates to a light guide unit emitting light from a surface of a light guide plate, a light source device including the light guide unit, and a display apparatus including the light source device.

2. Description of the Related Art

Mobile phones such as smartphones and the like, tablet terminals, personal computers, liquid crystal TVs and the like each include a liquid crystal display apparatus. A liquid crystal display apparatus includes a liquid crystal display panel, a backlight unit and the like. Backlight units are available in a direct type including a diffuser diffusing light from an LED (light emitting diode) provided at, for example, a back of a liquid crystal display panel, and an edge light type including a light guide plate located at a back of a liquid crystal display panel and an LED located to face an edge surface of the light guide plate. Light emitted from the LED enters into the light guide plate from the edge surface of the light guide plate, passes a light outgoing surface of the light guide plate and enters into the liquid crystal display panel from the rear surface of the liquid crystal display panel. On a light reflecting surface of the light guide plate opposite to the light outgoing surface, a reflection plate returning the light output from the light guide plate back to the light guide plate is disposed facing the liquid crystal display panel.

At a light reflecting surface of the light guide plate, a light scattering unit such as a dot pattern, a prism-like groove or the like is provided in order to scatter the light totally reflected inside the light guide plate and output the light from the light outgoing surface and also in order to make the luminance uniform at the light outgoing surface.

In the case where the light guide plate and the reflection plate are fixed to each other, the light reflecting surface of the light guide plate is not in contact with air having a small refractive index and thus does not fulfill the conditions required for the total reflection. As a result, the luminance at the light outgoing surface of the light guide plate is made non-uniform. In such a situation, a light guide unit including a light guide plate and a reflection plate bonded with each other via a dot pattern made of a pressure sensitive adhesive and a liquid crystal display apparatus including such a light guide unit are disclosed (see Japanese Laid-Open Patent Publication No. 2013-93195, (hereinafter "Patent Document 1")).

In the case where a conventional liquid crystal display apparatus as disclosed in Patent Document 1 uses a light guide plate having a coefficient of linear thermal expansion larger than that of the reflection plate, the reflection plate is contracted in accordance with a temperature change. By contrast, in the case where a light guide plate having a coefficient of linear thermal expansion smaller than that of the reflection plate is used, the light guide plate is contracted in accordance with a temperature change.

Figures 12A, 12B, 12C, 12D, 12E:
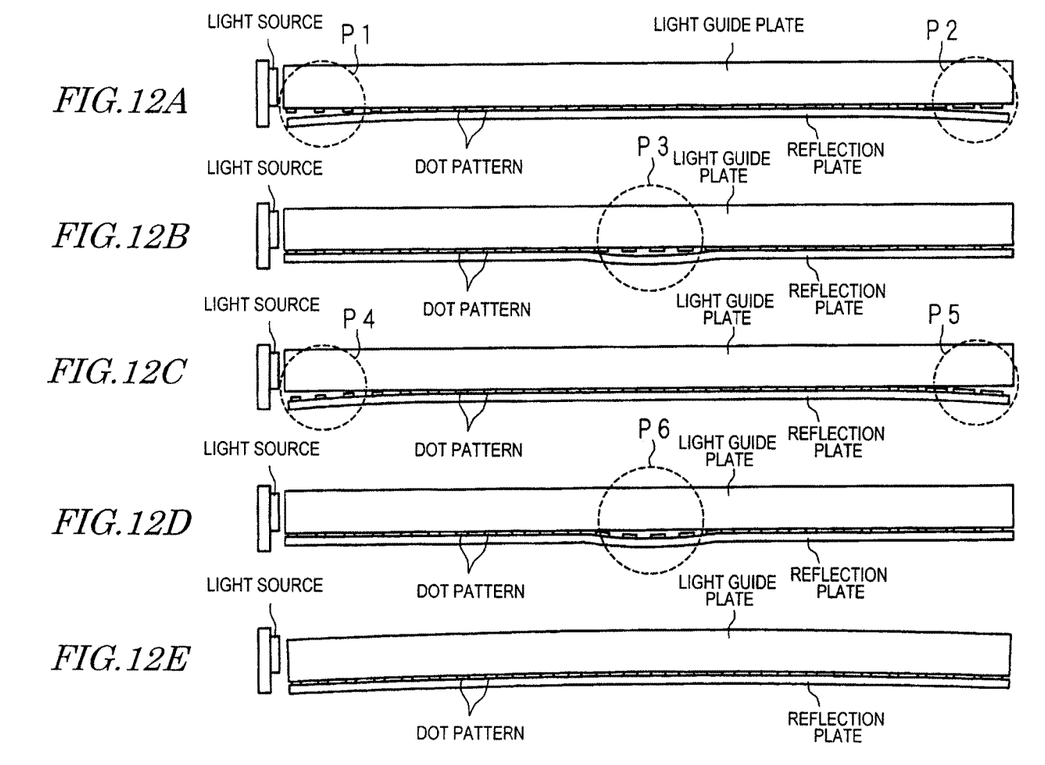
FIGS. 12A, 12B, 12C, 12D and 12E provide schematic views each showing an example of expansion and contraction of a conventional light guide plate and a conventional reflection plate.

FIGS. 12A to 12E provide schematic views each showing an example of expansion and contraction of a conventional light guide plate and a conventional reflection plate. FIG. 12A shows a state where the reflection plate is contracted more than the light guide plate. The reflection plate is delaminated in both of two end parts thereof. In FIG. 12A, an adhesive dot pattern is delaminated from the reflection plate (see reference signs P1 and P2). FIG. 12B shows a state where the light guide plate is contracted more than the reflection plate. The light guide plate is delaminated in a central part thereof. In FIG. 12B, the adhesive dot pattern is delaminated from the reflection plate (see reference sign P3). FIG. 12C shows a state where the reflection plate is contracted more than the light guide plate. The reflection plate is delaminated in both of two end parts thereof. In FIG. 12C, the adhesive dot pattern is delaminated from the light guide plate (see reference signs P4 and P5). FIG. 12D shows a state where the light guide plate is contracted more than the reflection plate. The light guide plate is delaminated in a central part thereof. In FIG. 12D, the adhesive dot pattern is delaminated from the light guide plate (see reference sign P6). FIG. 12E shows a case where the dot pattern has a pressure sensitive adhesivity strong enough to prevent the dot pattern from being delaminated from the light guide plate or the reflection plate, and shows a state where the reflection plate is contracted by the difference in the coefficient of linear thermal expansion between the light guide plate and the reflection plate and both of the light guide plate and the reflection plate are warped.

Figure 13A:
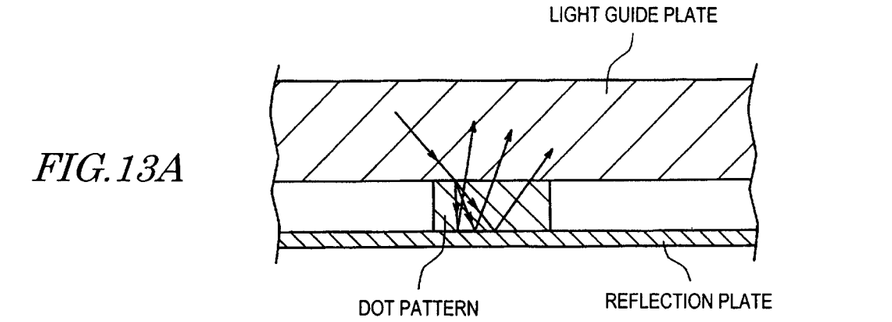
FIGS. 13A, 13B and 13C provide schematic views each showing an example of light propagation in a conventional reflection plate.
Figure 13B:
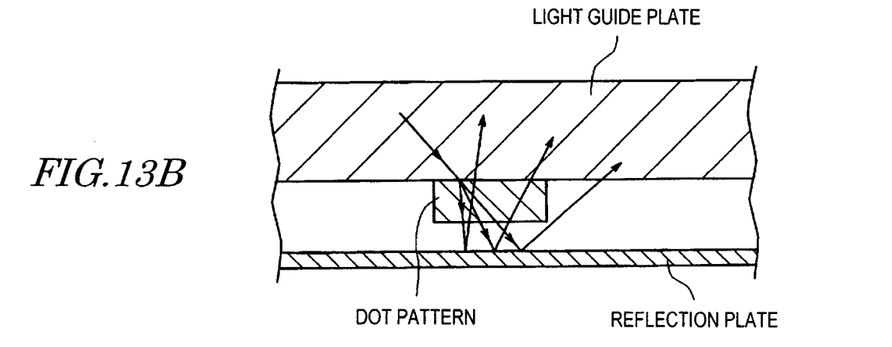
Figure 13C:
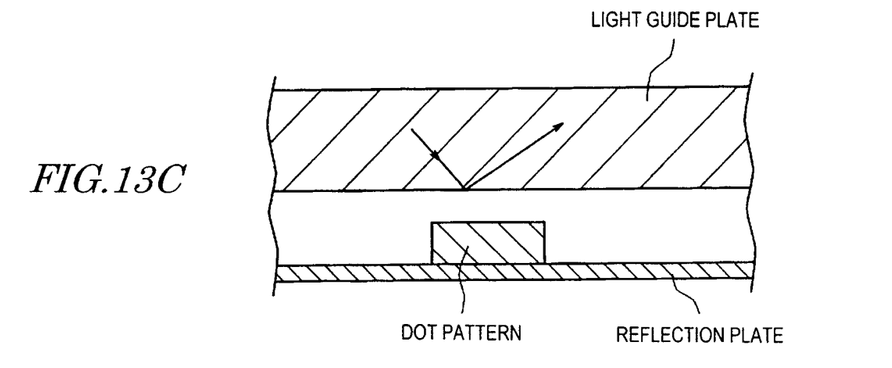

FIGS. 13A to 13C provide schematic views each showing an example of light propagation in a conventional light guide plate. FIG. 13A shows a state where neither the light guide plate nor the reflection plate is expanded or contracted, and the dot pattern is not delaminated. In this case, apart of the light propagating inside the light guide plate is transmitted through a light reflecting surface and is incident on the dot pattern. The dot pattern is light scattering. Therefore, the light incident on the dot pattern is scattered by the dot pattern and is incident back on the light guide plate. Namely, when a part of the light propagating inside the light guide plate is scattered by the dot pattern, the scattered light propagates toward the light outgoing surface of the light guide plate relatively uniformly. The amount of light propagating inside the light guide plate is smaller as the light is farther from a light source. However, the dot pattern is provided to have a higher density as the light is farther from the light source. Therefore, the amount of light scattered by the dot pattern is relatively large in an area far from the light source. In this manner, the luminance at the light outgoing surface of the light guide plate is made uniform.

FIG. 13B shows a state where the dot pattern is delaminated from the reflection plate as represented by reference signs P1, P2 and P3 in FIG. 12A and FIG. 12B. In this case, the dot pattern and the reflection plate are separated from each other, and the distance between the reflection plate and the light guide plate is increased. As a result, the light scattered by the dot pattern is incident on the light guide plate at diverged positions and the light is expanded. Therefore, the luminance distribution is made different from the luminance distribution that should be provided as shown in FIG. 13A, and thus a border between a bright region and a dark region is made at the light outgoing surface of the light guide plate.

FIG. 13C shows a state where the dot pattern is delaminated from the light guide plate as represented by reference signs P4, P5 and P6 in FIG. 12C and FIG. 12D. In this case, the light guide plate and the dot pattern are separated from each other, and thus the light reflecting surface of the light guide plate is put into contact with an air layer. As a result, the light is totally reflected by the light reflecting surface.

Therefore, the scattered light that should be output as shown in FIG. 13A is not output. Thus, the luminance is decreased, and a portion of the light outgoing surface of the light guide plate corresponding to the separated dot pattern and the vicinity thereof becomes dark.

As described above, a conventional liquid crystal display apparatus has a problem that the difference in the coefficient of linear thermal expansion between the light guide plate and the reflection plate, for example, warps the reflection plate or sags the light guide plate, resulting in luminance non-uniformity at the light outgoing surface of the light guide plate.

SUMMARY

The present invention made in light of the above-described situation has an object of providing a light guide unit, a light source device and a display apparatus preventing luminance non-uniformity at a light guide plate.

A light guide unit according to an embodiment of the present invention includes a light guide plate; and a reflection sheet located to face a first surface of the light guide plate. The light guide unit outputs light from a second surface of the light guide plate, which is opposite to the first surface. The light guide unit includes a plurality of light scattering units each including a scattering layer and a reflection layer stacked in this order, the plurality of light scattering units being located discretely along the first surface while the scattering layer of each of the plurality of light scattering units is located to face the first surface.

According to an embodiment of the present invention, the light guide unit includes the light guide plate and the reflection sheet located to face a first surface (light reflecting surface) of the light guide plate, and outputs light from a second surface (light outgoing surface) of the light guide plate, which is opposite to the first surface. The light guide unit includes the plurality of light scattering units each including the scattering layer and the reflection layer stacked in this order. The plurality of light scattering units are located discretely along the first surface of the light guide plate while the scattering layers are located to face the first surface of the light guide plate. Namely, the plurality of light scattering units are located discretely on the light reflecting surface of the light guide plate. The light guide units are sized to be larger, or are located more densely by, for example, shortening the interval between the light guide units adjacent to each other, as being farther from a light source located to face an edge surface of the light guide plate.

The light scattering units each include a scattering layer at the side of the light guide plate and include a reflection layer at the side of the reflection sheet. Therefore, the light incident on the light scattering unit from the light guide plate is reflected by the reflection layer and is not transmitted toward the reflection sheet. Thus, even if a part of the light scattering units is delaminated from the reflection sheet due to the difference in the coefficient of linear thermal expansion between the light guide plate and the reflection sheet, the distance between the light reflecting surface of the light guide plate and the reflection layer is the same regarding all the light scattering units. Therefore, the degree of expansion of the light scattered by the scattering layers of the delaminated light scattering units is not different from the degree of expansion of light scattered by the scattering layers of the light scattering units not delaminated. This suppresses a border between a bright region and a dark region from being generated at the light outgoing surface of the light guide plate, and thus the luminance non-uniformity is prevented.

In the light guide unit according to an embodiment of the present invention, the plurality of light scattering units each include a pressure sensitive adhesive layer stacked on a surface of the reflection layer; the scattering layer has pressure sensitive adhesivity; the scattering layer is fixed to the light guide plate; and the pressure sensitive adhesive layer is fixed to the reflection sheet.

According to an embodiment of the present invention, the light scattering portions each include the pressure sensitive adhesive layer stacked on a surface of the reflection layer; the scattering layer has pressure sensitive adhesivity; the scattering layer is fixed to the light guide plate; and the pressure sensitive adhesive layer is fixed to the reflection sheet. The scattering layer, which has pressure sensitive adhesivity, of each light scattering unit is fixed to the light reflecting surface of the light guide plate, and the pressure sensitive adhesive layer is fixed to the reflection sheet. Therefore, the light guide plate and the reflection sheet may be bonded with each other via the light scattering units. Even if a part of the light scattering units is delaminated from the reflection sheet due to the difference in the coefficient of linear thermal expansion between the light guide plate and the reflection sheet, the distance between the light reflecting surface of the light guide plate and the reflection layer is the same regarding all the light scattering units. Therefore, the degree of expansion of the light scattered by the scattering layers of the delaminated light scattering units is not different from the degree of expansion of light scattered by the scattering layers of the light scattering units not delaminated. This suppresses a border between a bright region and a dark region from being generated at the light outgoing surface of the light guide plate, and thus the luminance non-uniformity is prevented.

In the light guide unit according to an embodiment of the present invention, an adhesive force between the light guide plate and the scattering layer is higher than an adhesive force between the reflection sheet and the pressure sensitive adhesive layer.

According to an embodiment of the present invention, the degree of adhesive force between the light guide plate and the scattering layer is higher than the degree of adhesive force between the reflection sheet and the pressure sensitive adhesive layer. In the case where the degree of expansion and contraction is different between the light guide plate and the reflection sheet because of the difference in the coefficient of linear thermal expansion between the light guide plate and the reflection sheet, the light guide plate and the light scattering units are prevented from being delaminated from each other because the degree of adhesive force between the light guide plate and the scattering layer of each light scattering unit is relatively high. By contrast, the degree of adhesive force between the reflection sheet and the pressure sensitive adhesive layer of each light scattering unit is relatively small. Therefore, in the case where the degree of expansion and contraction is different between the light guide plate and the reflection sheet, the reflection sheet and the light scattering units may be delaminated from each other. This prevents the light guide plate and the reflection sheet from being warped or sagged. In the case where the light guide plate and the reflection sheet are shifted significantly, the light scattering units may be delaminated from the reflection sheet. This suppresses a border between a bright region and a dark region from being generated at the light outgoing surface of the light guide plate, and thus the luminance non-uniformity is prevented. In addition, since the light scattering units and the light guide plate are prevented from being delaminated from each other, the situation is prevented where the scattered light is not output, the luminance is decreased, and the light outgoing surface of the light guide plate is made dark.

A light source device according to an embodiment of the present invention includes the light guide unit according to any one of the above-described embodiments of the present inventions; and a light source unit which causes light to be incident on the light guide unit.

An embodiment of the present invention provides a light source device preventing luminance non-uniformity at the light guide plate.

A display apparatus according to an embodiment of the present invention includes the light source device according to the above-described embodiments of the present invention; and a display panel transmitting the light emitted from the light source device.

An embodiment of the present invention provides a display apparatus preventing luminance non-uniformity at the light guide plate.

According to an embodiment of the present invention, it is possible to prevent luminance non-uniformity of light emitted from a light guide plate.

DETAILED DESCRIPTION

Embodiment 1

Figure 1:
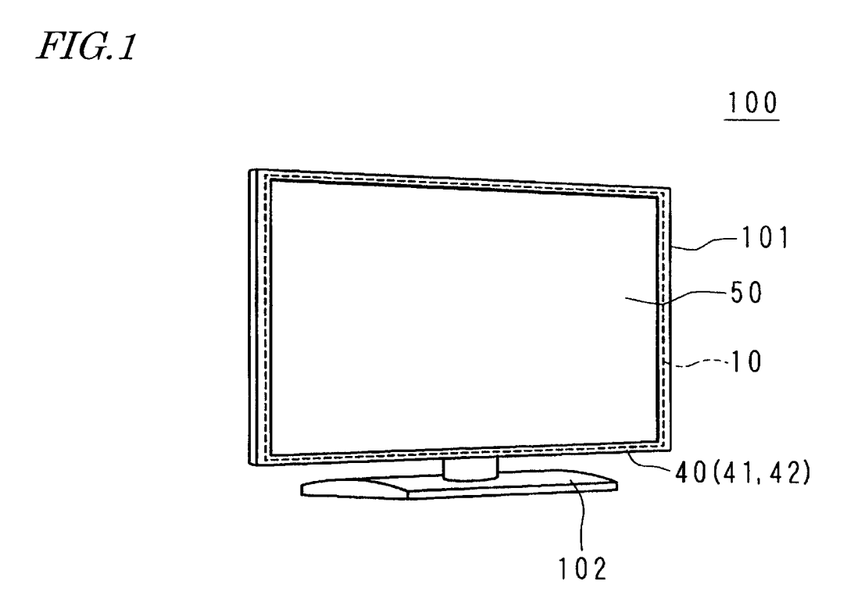
FIG. 1 is an external isometric view showing an example of a display apparatus according to embodiment 1.

Hereinafter, the present invention will be described with reference to the drawings showing embodiments thereof. FIG. 1 is an external isometric view of a display apparatus 100 according to embodiment 1. The display apparatus 100 may be used for, for example, a TV receiver, a personal computer, a mobile phone such as a smartphone or the like, a tablet terminal or the like. The display apparatus 100 includes a base 102, a display panel (liquid crystal panel) 50 having a display plane at one surface thereof, a bezel 101 covering a periphery of the display panel 50, a rectangular light guide plate 10 located at the rear (back) of the display panel 50 and having substantially the same size as that of the display panel 50, a light source unit 40 (including LED modules 41, a substrate 42 having the LED modules 41 mounted thereon, and the like) located to face an edge surface of the light guide plate 10, and the like.

In the example shown in FIG. 1, the display apparatus 100 includes the bezel 101 including four sides, namely, top, bottom, left and right sides, and the light source unit 40 is located only inner to the bottom side of the bezel 101. The display apparatus is not limited to having the structure shown in FIG. 1. For example, the light source unit may be located inner to each of the left side and the right side of the bezel 101.

Figure 2:
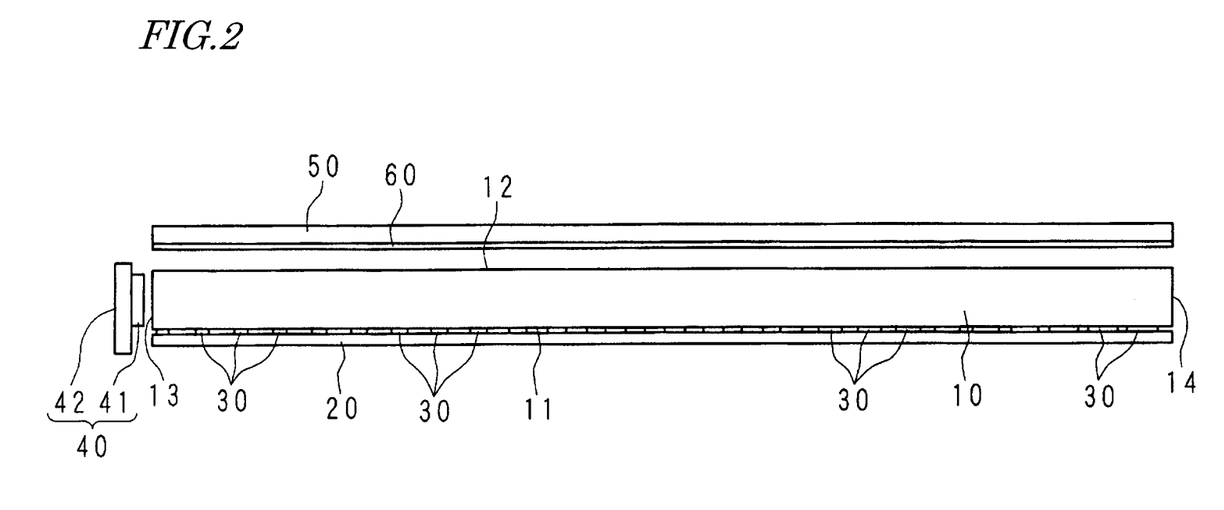
FIG. 2 shows an example of a part of the display apparatus according to embodiment 1.

FIG. 2 shows an example of a part of the display apparatus 100 according to embodiment 1. As shown in FIG. 2, the display apparatus 100 includes the display panel 50 having the display plane at one surface (front surface) thereof, an optical sheet 60 located at the rear of the display panel 50, the light guide plate 10 located to face the rear surface of the display panel 50 with the optical sheet 60 being provided between the rear surface and the light guide plate 10, a reflection sheet 20 located to face one surface (light reflecting surface) of the light guide plate 10, a plurality of light scattering units 30 located between the light guide plate 10 and the reflection sheet 20, the light source unit 40 located to face a light receiving surface 13 of the light guide plate 10, and the like.

A light guide unit includes the light guide plate 10, the reflection sheet 20, the light scattering units 30 and the like. A light source device includes the light guide unit, the light source unit 40 and the like.

The display panel 50 is rectangular as seen in a front view, includes glass substrates respectively at a front surface and a rear surface thereof, and a liquid crystal substance enclosed between the pair of glass substrates. A voltage may be applied to a driver driving each of pixels in the display panel 50 to vary the light transmittance, which is determined by an electro-optical characteristic of the liquid crystal substance. Thus, the amount of light transmitted through the display panel 50 may be controlled on a pixel-by-pixel basis to provide gray scale display of an image.

The optical sheet 60 has a rectangular shape slightly smaller than that of the display panel 50. The optical sheet 60 includes, in a stacked manner, one or a plurality of optical sheets having a light scattering function and one or a plurality of optical sheets having a light collecting function.

The light guide plate 10 is rectangular as seen in a front view, and a vertical size and a horizontal size that are approximately equal to those of the display panel 50. The light guide plate 10 is defined by a light reflecting surface 11 as a first surface, a light outgoing surface 12 as a second surface, a light receiving surface 13 as one edge surface on which light from the light source unit 40 is incident, an edge surface 14 opposite to the light receiving surface 13, and the like. The material of the light guide plate 10 is, for example, an acrylic resin, a polystyrene resin or the like, but is not limited to any of these materials.

The reflection sheet 20 is formed of, for example, PET, and has a size equivalent to that of the light guide plate 10. The reflection sheet 20 reflects the light from the light reflecting surface 11 of the light guide plate 10 so that the light enters back into the light guide plate 10.

The light source unit 40 includes the plurality of LED modules 41, the substrate 42 having the LED modules 41 mounted thereon, and the like. The substrate 42 is lengthy, and has the plurality of LED modules 41 located thereon with an appropriate interval. More specifically, the plurality of LED modules 41 are located linearly in a longitudinal direction of the substrate 42. With such a structure, the LED modules 41 are located to face the light receiving surface 13 of the light guide plate 10. The length of the substrate 42 is, for example, approximately equal to the vertical size or the horizontal size of the light guide plate 10.

The plurality of light scattering units 30 are provided discretely between the light reflecting surface 11 of the light guide plate 10 and the reflection sheet 20. The light scattering units 30 are sized to be larger as being farther from the light source unit 40 located to face the light receiving surface 13 of the light guide plate 10. The interval between the light scattering units 30 adjacent to each other is sized to be shorter as being farther from the light source unit 40. Namely, the density of the light scattering units 30 closer to the edge surface 14 is higher than that of the light scattering units 30 closer to the light receiving surface 13 of the light guide plate 10.

Figure 3:
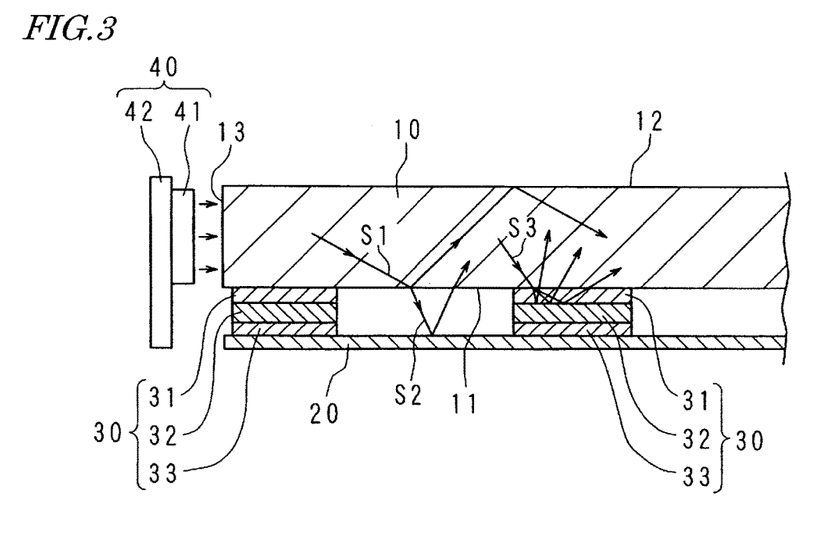
FIG. 3 is a schematic view showing example 1 of light propagation in, and in the vicinity of, a light scattering unit of a display apparatus according to embodiment 1.

FIG. 3 is a schematic view showing example 1 of propagation of light in, and in the vicinity of, the light scattering units 30 of the display apparatus 100 according to embodiment 1. The light scattering units 30 each include a scattering layer 31 having pressure sensitive adhesivity, a reflection layer 32 stacked on a surface of the scattering layer 31, and a pressure sensitive adhesive layer 33 stacked on a surface of the reflection layer 32. The scattering layer 31 is fixed to the light reflecting surface 11 of the light guide plate 10, and the pressure sensitive adhesive layer 33 is fixed to the reflection sheet 20.

The light emitted from the LED modules 41 is incident on the light receiving surface 13 of the light guide plate 10. As shown by reference sign S1 in FIG. 3, a part of the light incident on the light receiving surface 13 propagates inside the light guide plate 10 toward the edge surface 14 while being totally reflected by the light reflecting surface 11 and the light outgoing surface 12 of the light guide plate 10 in repetition.

As shown by reference sign S2 in FIG. 3, the light not totally reflected by the light reflecting surface 11 of the light guide plate 10 is transmitted through the light reflecting surface 11 and goes outside the light guide plate 10, but is reflected by the reflection sheet 20 and enters back into the light guide plate 10.

As shown by S3 in FIG. 3, a part of the light propagating inside the light guide plate 10 is transmitted through the light reflecting surface 11 and is incident on the light scattering unit 30. The scattering layer 31 of the light scattering unit 30 is light scattering and has the reflection layer 32 stacked on a surface thereof. Therefore, the light that has entered into the light scattering unit 30 is reflected by the reflection layer 32 and is scattered while passing the scattering layer 31, and thus enters back into the light guide plate 10.

More specifically, when a part of the light propagating inside the light guide plate 10 is scattered by the light scattering unit 30, the scattered light propagates toward the light outgoing surface 12 of the light guide plate 10 relatively uniformly. The amount of light propagating inside the light guide plate 10 is smaller as the light is farther from the light source unit 40, but the light scattering units 30 are more densely located as being farther from the light source unit 40. Therefore, the amount of light scattered by the light scattering units 30 in an area far from the light source unit 40 is relatively large, and thus the luminance at the light outgoing surface 12 of the light guide plate 10 is made uniform.

Figure 4:
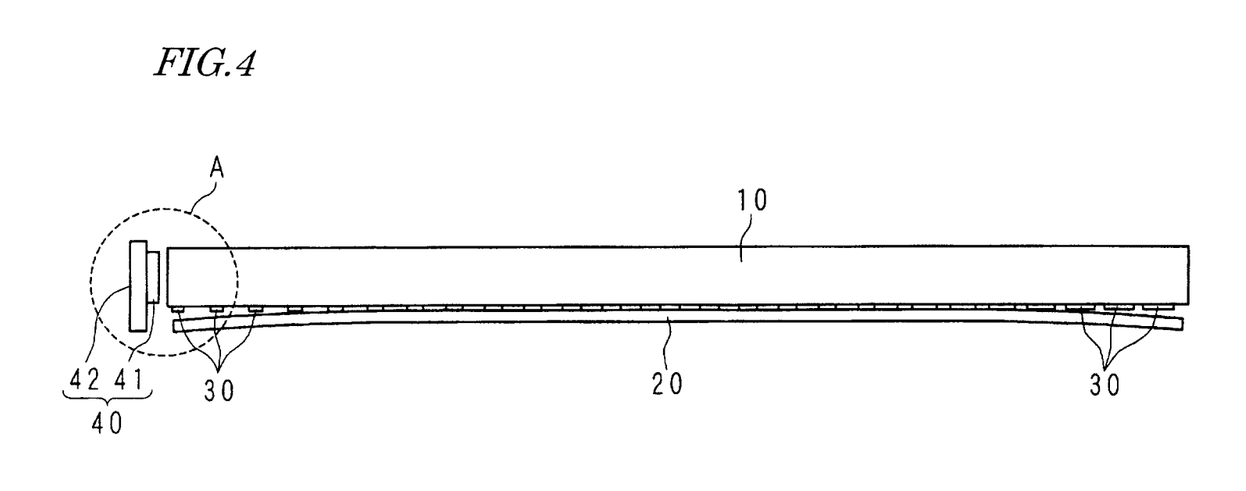
FIG. 4 is a schematic view showing an example in which a reflection sheet is delaminated from the light guide plate in the display apparatus according to embodiment 1.

FIG. 4 is a schematic view showing an example of state where the reflection sheet 20 is delaminated from the light guide plate 10 in the display apparatus 100 according to embodiment 1. In the example shown in FIG. 4, the reflection sheet 20 is contracted more than the light guide plate 10, and the reflection sheet 20 is delaminated in both of two end parts thereof. The light scattering units 30 are delaminated from the reflection sheet 20.

Figure 5:
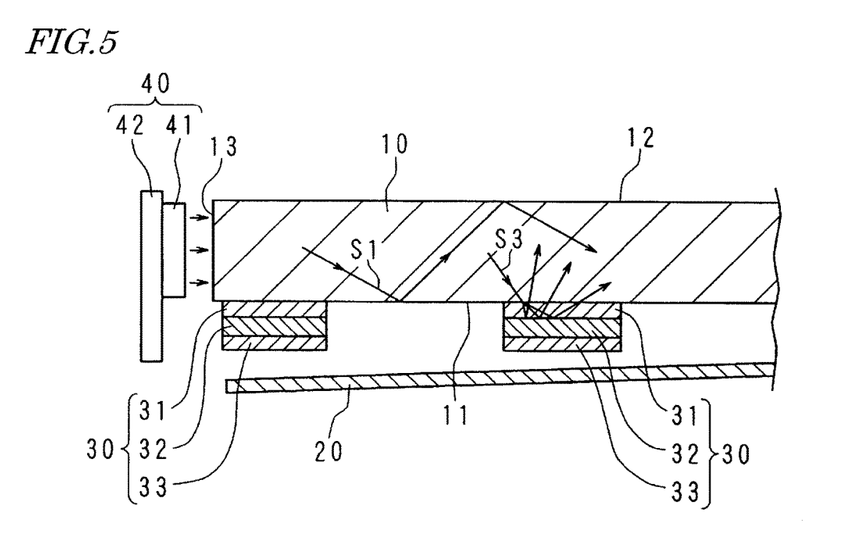
FIG. 5 is a schematic view showing example 2 of light propagation in, and in the vicinity of, the light scattering unit of the display apparatus according to embodiment 1.

FIG. 5 is a schematic view showing example 2 of propagation of light in, and in the vicinity of, the light scattering units 30 of the display apparatus 100 according to embodiment 1. FIG. 5 shows an area represented by reference sign A in FIG. 4. As shown by reference sign S1 in FIG. 5, a part of the light incident on the light receiving surface 13 propagates inside the light guide plate 10 toward the edge surface 14 while being totally reflected by the light reflecting surface 11 and the light outgoing surface 12 of the light guide plate 10 in repetition.

As shown by reference sign S3 in FIG. 5, a part of the light propagating inside the light guide plate 10 is transmitted through the light reflecting surface 11 and is incident on the light scattering unit 30 from which the reflection sheet 20 has been delaminated. The scattering layer 31 of the light scattering unit 30 is light scattering and has the reflection layer 32 stacked on a surface thereof. Therefore, the light that has entered into the light scattering unit 30 is reflected by the reflection layer 32 and is scattered while passing the scattering layer 31, and thus enters back into the light guide plate 10.

More specifically, even if a part of the light scattering units 30 is delaminated from the reflection sheet 20 due to the difference in the coefficient of linear thermal expansion between the light guide plate 10 and the reflection sheet 20, the distance between the light reflecting surface 11 of the light guide plate 10 and the reflection layer 32 is the same regarding all the light scattering units 30. Therefore, the degree of expansion of the light scattered by the scattering layers 31 of the delaminated light scattering units 30 is not different from the degree of expansion of light scattered by the scattering layers 31 of the light scattering units 30 not delaminated. This suppresses a border between a bright region and a dark region from being generated at the light outgoing surface 12 of the light guide plate 10, and thus the luminance non-uniformity is prevented.

Figure 6:
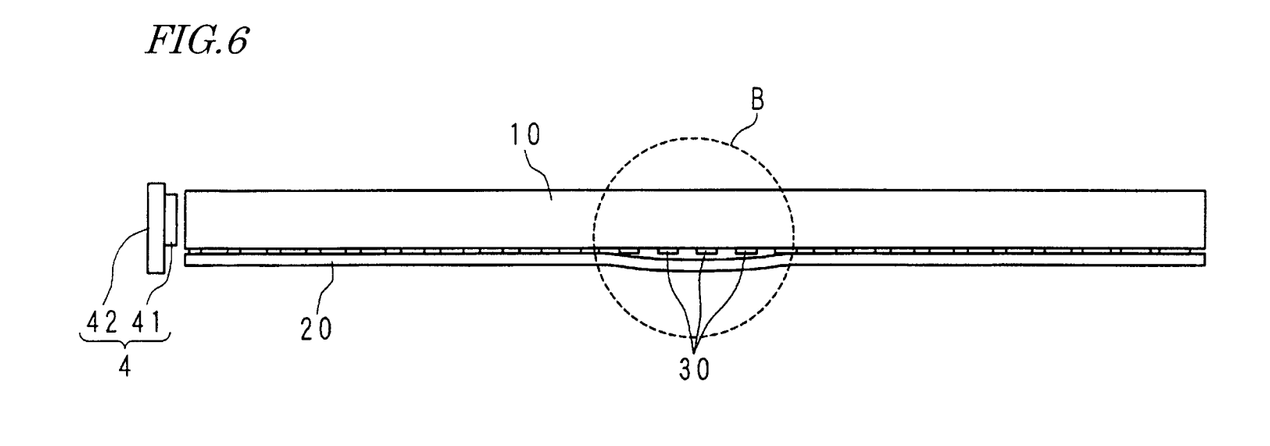
FIG. 6 is a schematic view showing another example in which the reflection sheet is delaminated from the light guide plate in the display apparatus according to embodiment 1.

FIG. 6 is a schematic view showing another example of state where the reflection sheet 20 is delaminated from the light guide plate 10 in the display apparatus 100 according to embodiment 1. In the example shown in FIG. 6, the light guide plate 10 is contracted more than the reflection sheet 20, and the light guide plate 10 is delaminated in a central part thereof. The light scattering units 30 are delaminated from the reflection sheet 20. The area represented by reference sign B in FIG. 6 is substantially the same as the area represented by reference sign A in FIG. 4 and the example shown in FIG. 5.

More specifically, even if a part of the light scattering units 30 is delaminated from the reflection sheet 20 due to the difference in the coefficient of linear thermal expansion between the light guide plate 10 and the reflection sheet 20, the distance between the light reflecting surface 11 of the light guide plate 10 and the reflection layer 32 is the same regarding all the light scattering units 30. Therefore, the degree of expansion of the light scattered by the scattering layers 31 of the delaminated light scattering units 30 is not different from the degree of expansion of light scattered by the scattering layers 31 of the light scattering units 30 not delaminated. This suppresses a border between a bright region and a dark region from being generated at the light outgoing surface 12 of the light guide plate 10, and thus the luminance non-uniformity is prevented.

The scattering layer 31 having pressure sensitive adhesivity of each light scattering unit 30 is fixed to the light reflecting surface 11 of the light guide plate 10, and the pressure sensitive adhesive layer 33 of the light scattering unit 30 is fixed to the reflection sheet 20. Therefore, the light guide plate 10 and the reflection sheet 20 may be bonded with each other via the light scattering units 30.

In this embodiment, the degree of adhesive force between the light guide plate 10 and the scattering layer 31 is higher than the degree of adhesive force between the reflection sheet 20 and the pressure sensitive adhesive layer 33. In the case where the degree of expansion and contraction is different between the light guide plate 10 and the reflection sheet 20 because of the difference in the coefficient of linear thermal expansion between the light guide plate 10 and the reflection sheet 20, the light guide plate 10 and the light scattering unit 30 are prevented from being delaminated from each other because the degree of adhesive force between the light guide plate 10 and the scattering layer 31 of each light scattering unit 30 is relatively high.

By contrast, the degree of adhesive force between the reflection sheet 20 and the pressure sensitive adhesive layer 33 of each light scattering layer 30 is relatively small. Therefore, in the case where the degree of expansion and contraction is different between the light guide plate 10 and the reflection sheet 20, the reflection sheet 20 and the light scattering units 30 may be delaminated from each other. This prevents the light guide plate 10, and the reflection sheet 20 from being warped or sagged. In the case where the light guide plate 10 and the reflection sheet 20 are shifted significantly, the light scattering units 30 may be delaminated from the reflection sheet 20. This suppresses a border between a bright region and a dark region from being generated at the light outgoing surface 12 of the light guide plate 10, and thus the luminance non-uniformity is prevented. In addition, since the light scattering units 30 and the light guide plate 10 are prevented from being delaminated from each other, the situation is prevented where the scattered light is not output, the luminance is decreased, and the light outgoing surface 12 of the light guide plate 10 is made dark.

Embodiment 2

Figure 7:
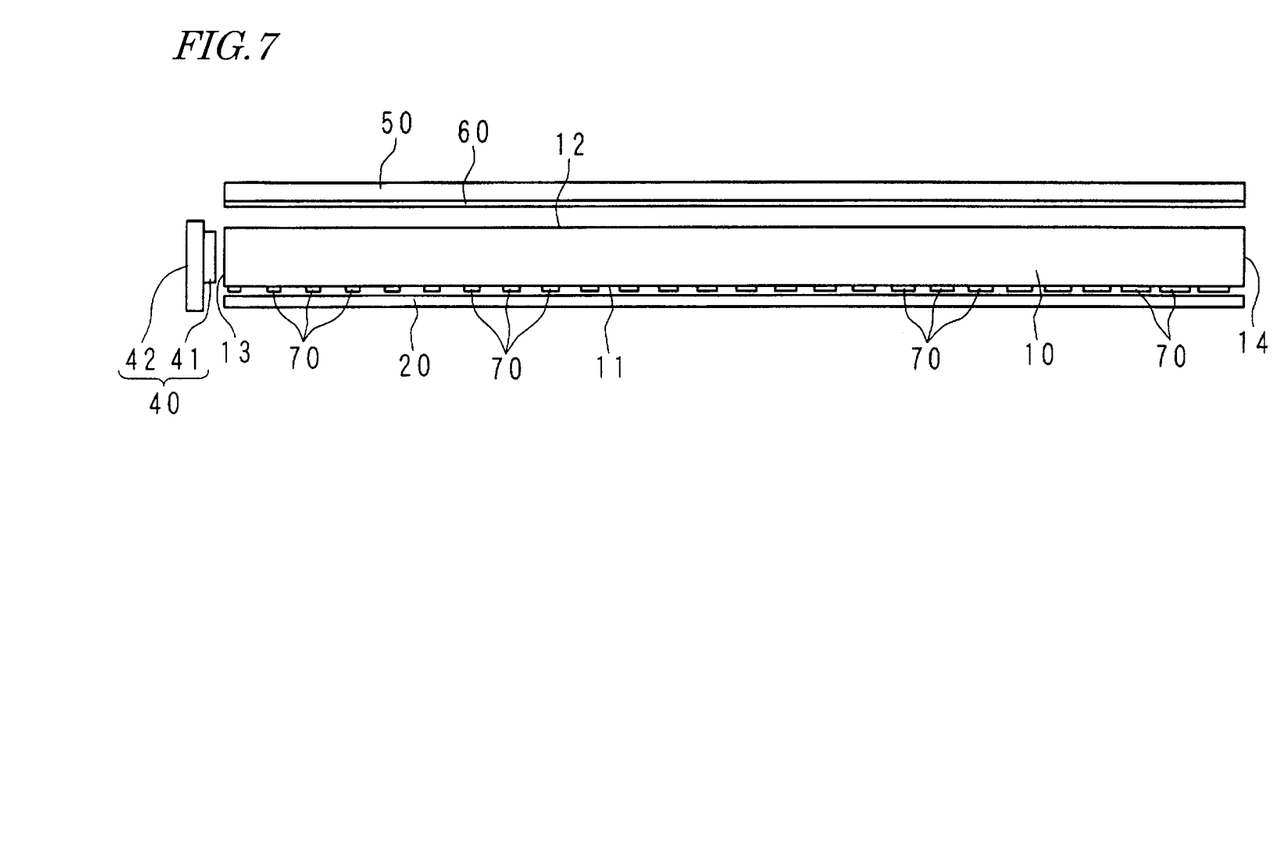
FIG. 7 shows an example of a part of a display apparatus according to embodiment 2.

FIG. 7 shows an example of a part of a display apparatus 100 according to embodiment 2. As shown in FIG. 7, in embodiment 2, like in embodiment 1, the display apparatus 100 includes the display panel 50 having a display plane at one surface (front surface) thereof, the optical sheet 60 located at the rear of the display panel 50, the light guide plate 10 located to face the rear surface of the display panel 50 with the optical sheet 60 being provided between the rear surface and the light guide plate 10, the reflection sheet 20 located to face one surface (light reflecting surface) of the light guide plate 10, the plurality of light scattering units 70 located between the light guide plate 10 and the reflection sheet 20, the light source unit 40 located to face the light receiving surface 13 of the light guide plate 10, and the like.

Unlike in embodiment 1, in embodiment 2, the light scattering units 70 of the light guide unit each include a scattering layer and a reflection layer stacked in this order. The plurality of light scattering units 70 are located discretely along the light reflecting surface 11 of the light guide plate 10 while the scattering layers are located to face the light reflecting surface 11 of the light guide plate 10. There is a gap between the light scattering units 70 and the reflection sheet 20. Hereinafter, this will be described in detail.

Figure 8:
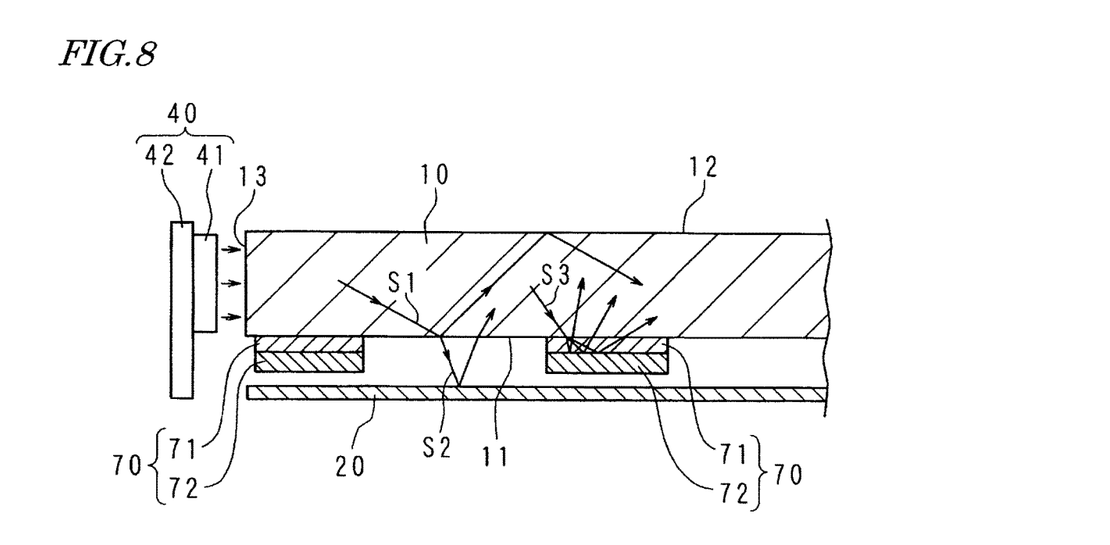
FIG. 8 is a schematic view showing example 1 of light propagation in, and in the vicinity of, a light scattering unit of the display apparatus according to embodiment 2.

FIG. 8 is a schematic view showing example 1 of propagation of light in, and in the vicinity of, the light scattering units 70 of the display apparatus 100 according to embodiment 2. The light scattering units 70 each include a scattering layer 71 having pressure sensitive adhesivity and a reflection layer 72 stacked on a surface of the scattering layer 71. The scattering layer 71 is fixed to the light reflecting surface 11 of the light guide plate 10. The reflection layer 72 and the reflection sheet 20 have a predetermined gap therebetween.

The light emitted from the LED modules 41 is incident on the light receiving surface 13 of the light guide plate 10. As shown by reference sign S1 in FIG. 8, a part of the light incident on the light receiving surface 13 propagates inside the light guide plate 10 toward the edge surface 14 while being totally reflected by the light reflecting surface 11 and the light outgoing surface 12 of the light guide plate 10 in repetition.

As shown by reference sign S2 in FIG. 8, the light not totally reflected by the light reflecting surface 11 of the light guide plate 10 is transmitted through the light reflecting surface 11 and goes outside the light guide plate 10, but is reflected by the reflection sheet 20 and enters back into the light guide plate 10.

As shown by S3 in FIG. 8, a part of the light propagating inside the light guide plate 10 is transmitted through the light reflecting surface 11 and is incident on the light scattering unit 70. The scattering layer 71 of the light scattering unit 70 is light scattering and has the reflection layer 72 stacked on a surface thereof. Therefore, the light that has entered into the light scattering unit 70 is reflected by the reflection layer 72 and is scattered while passing the scattering layer 71, and thus enters back into the light guide plate 10.

Figure 9:
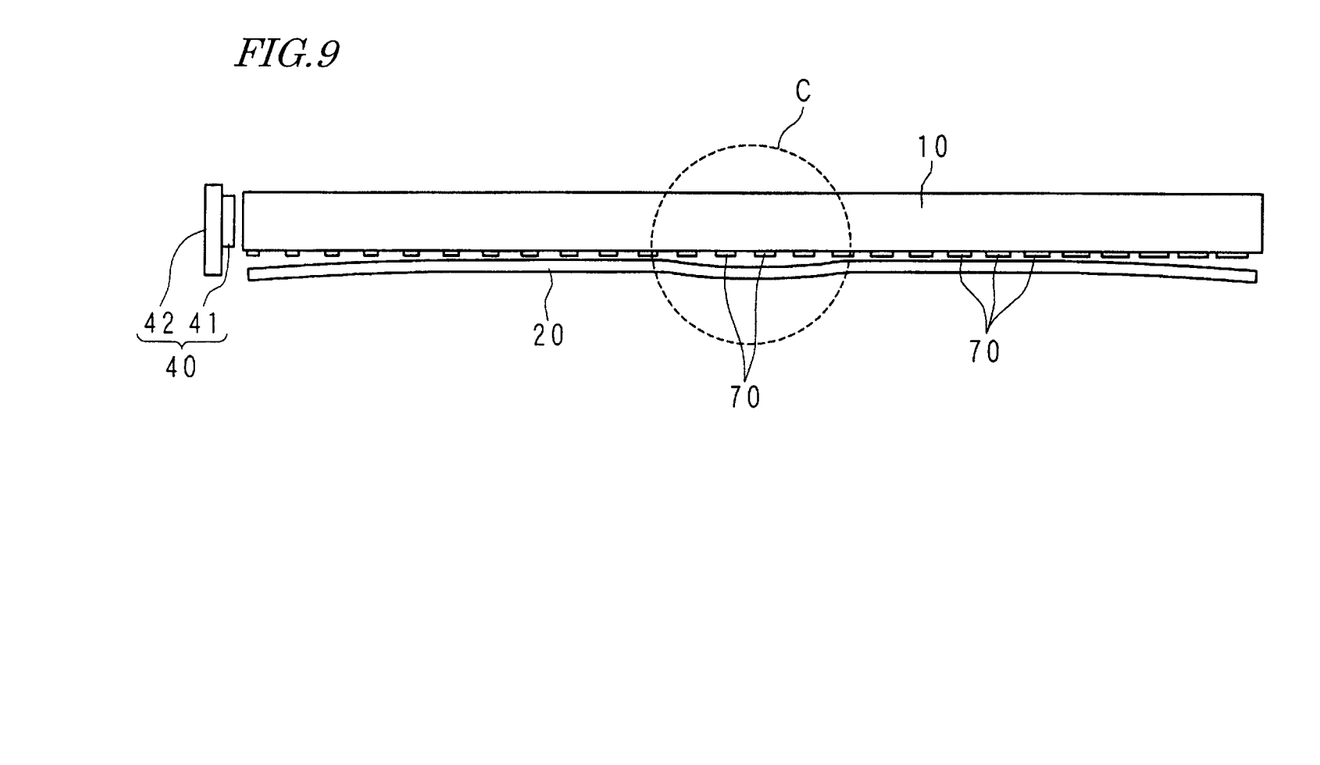
FIG. 9 is a schematic view showing an example in which a reflection sheet is delaminated from the light guide plate in the display apparatus according to embodiment 2.

FIG. 9 is a schematic view showing an example of state where the reflection sheet 20 is sagged.

Figure 10:
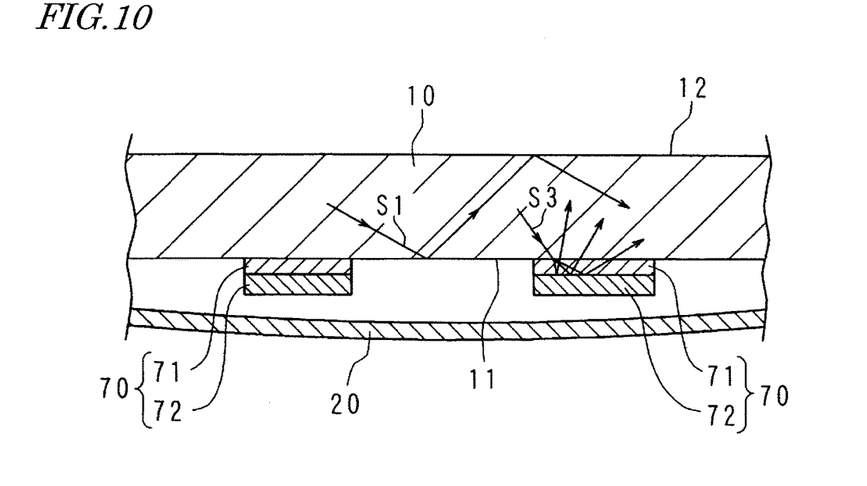
FIG. 10 is a schematic view showing example 2 of light propagation in, and in the vicinity of, the light scattering unit of the display apparatus according to embodiment 2.

FIG. 10 is a schematic view showing example 2 of propagation of light in, and in the vicinity of, the light scattering units 70 of the display apparatus 100 according to embodiment 2. FIG. 10 shows an area represented by reference sign C in FIG. 9. As shown by reference sign S1 in FIG. 10, a part of the light incident on the light receiving surface 13 propagates inside the light guide plate 10 toward the edge surface 14 while being totally reflected by the light reflecting surface 11 and the light outgoing surface 12 of the light guide plate 10 in repetition.

As shown by reference sign S3 in FIG. 10, a part of the light propagating inside the light guide plate 10 is transmitted through the light reflecting surface 11 and is incident on the light scattering unit 70. The scattering layer 71 of the light scattering unit 70 is light scattering and has the reflection layer 72 stacked on a surface thereof. Therefore, the light that has entered into the light scattering unit 70 is reflected by the reflection layer 72 and is scattered while passing the scattering layer 71, and thus enters back into the light guide plate 10.

The light scattering unit 70 includes the scattering layer 71 at the side of the light guide plate 10 and includes the reflection layer 72 at the side of the reflection sheet 20. Therefore, the light incident on the light scattering unit 70 from the light guide plate 10 is reflected by the reflection layer 72 and is not transmitted toward the reflection sheet 20. Thus, even if the reflection sheet 20 is sagged, the distance between the light reflecting surface 11 of the light guide plate 10 and the reflection layer 72 is the same regarding all the light scattering units 70. Therefore, the degree of expansion of the light scattered by the scattering layers 71 is not influenced by the sag of the reflection sheet 20. This suppresses a border between a bright region and a dark region from being generated at the light outgoing surface 12 of the light guide plate 10, and thus the luminance non-uniformity is prevented.

Figure 11:
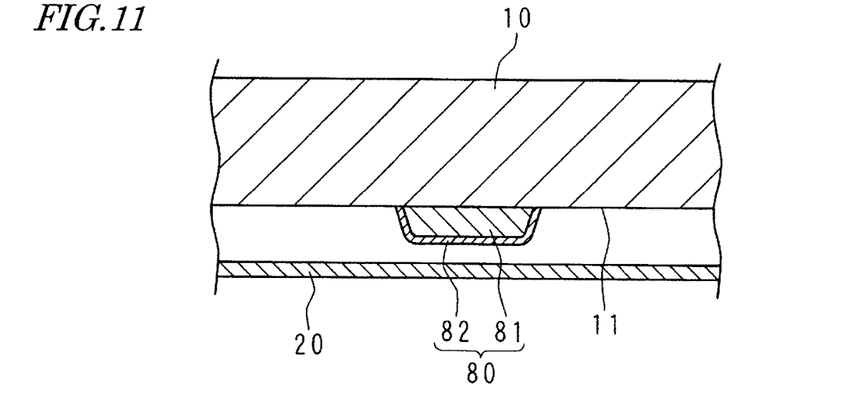
FIG. 11 shows a structure of a light scattering unit in another example of the display apparatus according to embodiment 2.

FIG. 11 shows a structure of a light scattering unit 80 in another example of the display apparatus 100 according to embodiment 2. The light scattering unit 80 includes a scattering layer 81 fixed to the light reflecting surface 11 of the light guide plate 10 and a reflection layer 82 stacked so as to cover the scattering layer 81. A plurality of the light scattering units 80 are provided discretely along the light reflecting surface 11 of the light guide plate 10. There is a gap between the light scattering units 80 and the reflection sheet 20.

In the structure shown in FIG. 11 also, the light scattering unit 80 includes the scattering layer 81 at the side of the light guide plate 10 and includes the reflection layer 82 at the side of the reflection sheet 20. Therefore, the light that has entered into the light scattering unit 80 from the light guide plate 10 is reflected by the reflection layer 82 and is not transmitted toward the reflection sheet 20. Especially, the reflection layer 82 is stacked on a side surface of the scattering layer 81 in addition to the surface of the scattering layer 81 facing the reflection sheet 20. Therefore, the reflection layer 82 prevents the light that has entered into the light scattering unit 80 from being transmitted toward the reflection sheet 20.

Even if the reflection sheet 20 is sagged, the distance between the light reflecting surface 11 of the light guide plate 10 and the reflection layer 82 is the same regarding all the light scattering units 80. Therefore, the degree of expansion of the light scattered by the scattering layers 71 is not influenced by the sag of the reflection sheet 20. This suppresses a border between a bright region and a dark region from being generated at the light outgoing surface 12 of the light guide plate 10, and thus the luminance non-uniformity is prevented.

In embodiments 1 and 2 described above, the luminance non-uniformity is prevented in an area of the light outgoing surface of the light guide plate corresponding to a portion where the reflection sheet is delaminated from the light guide plate or a portion where the reflection sheet is sagged. Even if the light guide plate and the reflection sheet are shifted significantly, the light guide plate is prevented from being warped because the light scattering units are delaminated from the reflection sheet. Even though the reflection sheet is delaminated, the light guide plate and the light scattering units are not delaminated from each other. Therefore, the luminance non-uniformity at the light outgoing surface of the light guide plate is prevented.

Embodiments 1 and 2 described above provide a light source device and a display apparatus preventing the luminance non-uniformity at the light guide plate. A surface emission-type illumination device may be provided by use of the light source device in this embodiment. In this case, the luminance non-uniformity at a light emitting surface of the illumination device may be prevented.

What is claimed is:

1. A light guide unit, comprising:
    a light guide plate having a light outgoing surface and a light reflecting surface, the reflecting surface being opposite to the light outgoing surface;
    a reflection sheet disposed facing the reflecting surface of the light guide plate, and
    a plurality of light scattering units provided between the light guide plate and the reflection sheet, the plurality of light scattering units being apart for one another along the light reflecting surface, wherein
    each of the plurality of light scattering units comprises a scattering layer and a reflection layer formed on the scattering layer, the scattering layer being fixed on the light reflecting surface.

2. The light guide unit of claim 1, wherein the scattering layer has pressure sensitive adhesivity.

3. The light guide unit of claim 2, wherein
    the plurality of light scattering units each comprises a pressure sensitive adhesive layer formed on a surface of the reflection layer, and
    the pressure sensitive adhesive layer is fixed to the reflection sheet.

4. The light guide unit of claim 3, wherein
    an adhesive force between the light guide plate and the scattering layer is higher than an adhesive force between the reflection sheet and the pressure sensitive adhesive layer.

5. The light guide unit of claim 1, wherein
    the reflection layer and the reflection sheet are disposed with a gap therebetween.

6. A light source device, comprising:
    the light guide unit of claim 1; and
    a light source unit which causes light to be incident on the light guide unit.

7. A display apparatus, comprising:
    the light source device of claim 6; and
    a display panel transmitting light emitted from the light source device.

* * * * *